United States Patent
Ishihara et al.

(10) Patent No.: US 7,125,936 B2
(45) Date of Patent: Oct. 24, 2006

(54) CLEAR COATING COMPOSITION, METHOD OF FORMING A COATING FILM AND MULTILAYER COATING FILM

(75) Inventors: Tatsuya Ishihara, Tokyo (JP); Masahiko Yamanaka, Kanagawa (JP); Tetsuji Mizuno, Kanagawa (JP); Takashi Moriwake, Tokyo (JP); Hisaki Tanabe, Kyoto (JP); Goro Nagao, Kanagawa (JP)

(73) Assignees: Nissan Motor Co., Ltd., Kanagawa (JP); Nippon Paint Co., Ltd., Osaka (JP)

(*) Notice: Subject to any disclaimer, the term of this patent is extended or adjusted under 35 U.S.C. 154(b) by 317 days.

(21) Appl. No.: 10/637,870

(22) Filed: Aug. 8, 2003

(65) Prior Publication Data

US 2005/0214549 A1 Sep. 29, 2005

Related U.S. Application Data

(62) Division of application No. 09/919,531, filed on Jul. 31, 2001, now Pat. No. 6,635,351.

(30) Foreign Application Priority Data

| Jul. 31, 2000 | (JP) | ............................. 2000-231075 |
| Jul. 31, 2000 | (JP) | ............................. 2000-231076 |
| Nov. 8, 2000 | (JP) | ............................. 2000-340795 |

(51) Int. Cl.
  *C08L 83/07* (2006.01)
(52) U.S. Cl. ...................................... 525/474; 526/279
(58) Field of Classification Search ................ 525/474; 526/279
See application file for complete search history.

(56) References Cited

U.S. PATENT DOCUMENTS 5,270,392 A 12/1993 Okude et al.
5,491,203 A * 2/1996 Matsui et al. ............... 525/474

FOREIGN PATENT DOCUMENTS

| JP | 3-287650 | 12/1991 |
| JP | 4-363374 | 12/1992 |
| JP | 6-57077 | 3/1994 |
| JP | 6-108001 | 4/1994 |
| JP | 6-128446 | 5/1994 |
| JP | 07-113062 | 5/1995 |
| JP | 7-166124 | 6/1995 |
| JP | 7-292313 | 11/1995 |
| JP | 07-331165 | 12/1995 |
| JP | 0700 951 | 3/1996 |
| JP | 08-259892 | 10/1996 |
| JP | 09-059557 | 3/1997 |
| JP | 10-251593 | 9/1998 |
| JP | 2000-086975 | 3/2000 |

OTHER PUBLICATIONS

U.S. Appl. No. 09/919,531, filed Jul. 31, 2001, Tatsuya Ishihara et al.

* cited by examiner

*Primary Examiner*—Kuo-Liang Peng
(74) *Attorney, Agent, or Firm*—Jordan and Hamburg LLP

(57) ABSTRACT

It is an object of the invention to provide a clear coating composition, which can give coating films showing good water repellency, in other words a factor giving a care-free and deluxe feeling to car owners, and which are excellent in non-sanding recoating dirtied coatings after due repair, as well as a method of forming a coating film and a multilayered coating film. The invention provides a clear coating composition which comprises (A) 100 parts by mass of the sum of a crosslinkable coating film-forming resin and a crosslinking agent on a solid basis and (B) 0.01 to 2 parts by mass of a ladder silicone copolymer obtainable by copolymerizing (b-1) a (meth)acryloxyalkyl-containing ladder silicone oligomer, (b-2) a crosslinkable functional group-containing ethylenically unsaturated monomer and optionally (b-3) another ethylenically unsaturated monomer.

4 Claims, No Drawings

CLEAR COATING COMPOSITION, METHOD OF FORMING A COATING FILM AND MULTILAYER COATING FILM

This is a Divisional of application Ser. No. 09/919,531 filed Jul. 31, 2001 now Issued as U.S. Pat. No. 6,635,351.

TECHNICAL FIELD

The present invention relates to a clear coating composition, a method of forming a coating film, and a multilayer coating film.

BACKGROUND ART

Among problems encountered by car drivers of late, the problem of bird droppings sticking to the coating film of the parked car, which droppings can be removed only with difficulty, and the problem of splashes of mud staining the car coating film as found after driving through wet weather, which necessitates washing of the car with rubbing, are of great concern. With the recent years' growth in demand for high-quality, maintenance-free cars, coating systems resistant to staining and capable of being deprived of stains in the event of staining have been demanded.

In car production lines, on the other hand, it is difficult to entirely prevent the occurrence of troubles due to adhesion of motes, dirt or the like. The coating film to which such a dirtying substance has adhered is repaired by recoating. In such cases, it has been common practice to remove the dirtying substance, polish the dirtied site, and recoat the polished site. From the work simplification and other points of view, coating systems capable of providing for a recoating film with good adhesion without polishing of the dirtied surface (hereinafter referred to as non-sanding recoatability) have been searched for.

Japanese Kokai Publication Hei-7-292313 describes an automotive coating composition capable of providing coating films well balanced among adhesion to the undercoat, scratch resistance, water resistance, oil resistance, weathering resistance, stain resistance and gloss which comprises a copolymer resulting from copolymerization of a silicone oligomer having ladder structure (hereinafter referred to as ladder silicone oligomer) having a specified molecular weight and a (meth)acryloxyalkyl group content in side chains of each molecule of 1 to 50% with at least one monomer selected from among (meth)acrylate esters, (meth)acrylamide, methylol(meth)acrylamide, alkoxymethylol (meth)acrylamides, unsaturated carboxylic acids, styrene and vinyl esters, as well as an organic solvent therefor, an ultraviolet absorber, an antioxidant and a crosslinking agent incorporated therein. In the automotive coating composition described in the above-cited publication Japanese Kokai Publication Hei-07-292313, the copolymer included ladder silicone oligomer (hereinafter referred to as ladder silicone copolymer), together with the crosslinking agent, constitutes the main component of the vehicle. From the non-sanding recoatability viewpoint, however, the composition is still unsatisfactory.

SUMMARY OF THE INVENTION

It is a primary object of the invention to provide a clear coating composition, which can give coating films showing good water repellency, in other words a factor giving a care-free and deluxe feeling to car owners, and which are excellent in non-sanding recoatability in recoating dirtied coatings after due repair, as well as a method of forming a coating film and a multilayered coating film.

The present inventors made intensive investigations in an attempt to accomplish the above object and have now completed the present invention.

Thus, in a first aspect, the invention provides a clear coating composition
which comprises:

(A) 100 parts by mass of a mixture of a crosslinkable coating film-forming resin and a crosslinking agent on the solid basis and (B) 0.01 to 2 parts by mass of a ladder silicone copolymer obtainable by copolymerizing (b-1) a (meth) acryloxyalkyl-containing ladder silicone oligomer, (b-2) a crosslinkable functional group-containing ethylenically unsaturated monomer and optionally (b-3) another copolymerizable ethylenically unsaturated monomer.

In a second aspect, the invention provides a clear coating composition
which comprises:

(C) 20 to 60% by mass of a carboxyl- and carboxylate ester group-containing polymer obtainable by reacting an acid anhydride group-containing polymer obtainable from 15 to 40% by mass of (c-1) an acid anhydride group-containing ethylenically unsaturated monomer and 60 to 85% by mass of (c-2) another copolymerizable ethylenically unsaturated monomer with (c-3) a monohydric alcohol containing 1 to 12 carbon atoms in proportions such that the mole ratio between acid anhydride and hydroxyl groups amounts to 1/10 to 1/1, (D) 0.1 to 60% by mass of a hydroxyl- and glycidyl containing polymer obtainable by copolymerizing 5 to 60% by mass of (d-1) a hydroxyl-containing ethylenically unsaturated monomer having the structure represented by the formula (1):

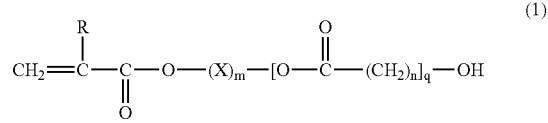

wherein R is a hydrogen atom or a methyl group, X is a straight or branched alkylene or hydroxyalkylene group, m is an integer of 2 to 8, n is an integer of 3 to 7 and q is an integer of 0 to 4, 10 to 60% by mass of a glycidyl-containing ethylenically unsaturated monomer (d-2) and optionally 0 to 85% by mass of (d-3) another copolymerizable ethylenically unsaturated monomer, and (E) 0.01 to 60% by mass of a hydroxyl-, glycidyl- and ladder silicone-containing polymer obtainable by copolymerizing 5 to 60% by mass of (e-1) a hydroxyl-containing ethylenically unsaturated monomer represented by the formula (2):

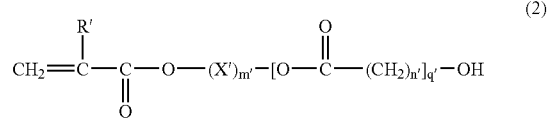

wherein R' is a hydrogen atom or a methyl group, X' is a straight or branched alkylene or hydroxyalkylene group, m' is an integer of 2 to 8, n' is an integer of 3 to 7 and q' is an integer of 0 to 4, 10 to 60% by mass of (e-2) a glycidyl-containing ethylenically unsaturated monomer, 1 to 30% by mass of (e-3) a (meth)acryloxyalkyl-containing ladder silicone oligomer and optionally 0 to 85% by mass of (e-4) another copolymerizable ethylenically unsaturated monomer.

In a third aspect, the invention provides a clear coating composition which comprises:

(C) 20 to 60% by mass of a carboxyl- and carboxylate ester group-containing polymer obtainable by reacting an acid anhydride group-containing polymer obtainable from 15 to 40% by mass of (c-1) an acid anhydride group-containing ethylenically unsaturated monomer and 60 to 85% by mass of (c-2) another copolymerizable ethylenically unsaturated monomer with (c-3) a monohydric alcohol containing 1 to 12 carbon atoms in proportions such that the mole ratio between acid anhydride and hydroxyl groups amounts to 1/10 to 1/1, (D) 10 to 60% by mass of a hydroxyl- and glycidyl-containing polymer obtainable by copolymerizing 5 to 60% by mass of (d-1) a hydroxyl-containing ethylenically unsaturated monomer having the structure represented by the formula (1)

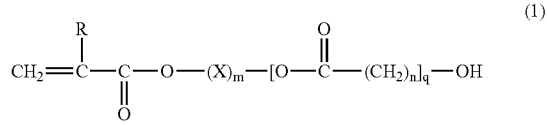

(1)

wherein R is a hydrogen atom or a methyl group, X is a straight or branched alkylene or hydroxyalkylene group, m is an integer of 2 to 8, n is an integer of 3 to 7 and q is an integer of 0 to 4, 10 to 60% by mass of (d-2) a glycidyl-containing ethylenically unsaturated monomer and optionally 0 to 85% by mass of (d-3) another copolymerizable ethylenically unsaturated monomer, (E) 0.1 to 25% by mass of a hydroxyl-, glycidyl- and ladder silicone-containing polymer obtainable by copolymerizing 5 to 60% by mass of (e-1) a hydroxyl-containing ethylenically unsaturated monomer represented by the formula (2):

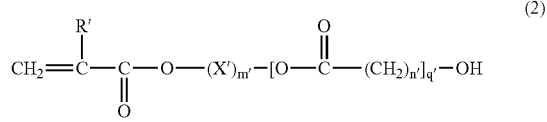

(2)

wherein R' is a hydrogen atom or a methyl group, X' is a straight or branched alkylene or hydroxyalkylene group, m' is an integer of 2 to 8, n' is an integer of 3 to 7 and q' is an integer of 0 to 4, 10 to 60% by mass of (e-2) a glycidyl-containing ethylenically unsaturated monomer, 1 to 30% by mass of (e-3) a (meth)acryloxyalkyl-containing ladder silicone oligomer and optionally 0 to 85% by mass of (e-4) another copolymerizable ethylenically unsaturated monomer, and (F) a polyethylene oxide- or polypropylene oxide-modified polysilicone compound.

It also provides a method of forming a coating film
which comprises:

forming a metallic or solid base coating film on a substrate directly or via an undercoating film, and then, without curing said metallic or solid base coating film, forming a clear coating film thereon by applying the above clear coating composition and subjecting said metallic or solid base coating film and the clear coating film simultaneously to drying and baking.

It further provides a multilayer coating film which comprises a metallic or solid base coating formed on a substrate directly or via an undercoating film and a clear coating film formed thereon by using the above-mentioned clear coating composition.

DETAILED DESCRIPTION OF THE INVENTION

In the following, the present invention is described in detail. The contents of materials and the formulations thereof in this specification are expressed by solid contents except for solvents or the like.

Clear Coating Composition

The clear coating composition according to the first aspect of the invention give coating films excellent in water repellency and non-sanding recoatability. The clear coating composition according to the first aspect of the invention comprises (A) 100 parts by mass (on the solid basis) of the sum of a crosslinkable coating film-forming resin and a crosslinking agent and (B) 0.01 to 2 parts by mass of a ladder silicone copolymer obtainable by copolymerizing (b-1) a (meth)acryloxyalkyl-containing ladder silicone oligomer, (b-2) a crosslinkable functional group-containing ethylenically unsaturated monomer and optionally (b-3) another copolymerizable ethylenically unsaturated monomer. If the ladder silicone copolymer (B) content is less than 0.01 part by mass, the resulting coating films will show no good water repellency. If it exceeds 2 parts by mass, no good non-sanding recoatability will be obtained. An amount of 0.05 to 1 part by mass is preferred.

In the clear coating composition according to the first aspect of the invention, the above-mentioned crosslinkable coating film-forming resin and crosslinking agent constitute the vehicle. As the crosslinkable coating film-forming resin, there may be mentioned, among others, acrylic resins, polyester resins, alkyd resins, fluorine-containing resins, epoxy resins, polyurethane resins and polyether resins. Among them, acrylic resins and polyester resins are preferred from the weathering resistance viewpoint. Optionally, two or more of these may be used in combination.

The above crosslinkable coating film-forming resin can be used in admixture with an amino resin, (blocked) polyisocyanate, amine, polyamide, polybasic carboxylic acid or like crosslinking agent, so that the curing reaction may proceed upon heating or at ordinary temperature.

As the acrylic resins, there may be mentioned copolymers of an acrylic monomer and another ethylenically unsaturated monomer. Usable as the acrylic monomer for copolymerization are methyl, ethyl, propyl, n-butyl, isobutyl, tert-butyl, 2-ethylhexyl, lauryl, phenyl, benzyl, 2-hydroxyethyl, 2-hydroxypropyl and other esters of acrylic acid or methacrylic acid, products resulting from ring opening addition of caprolactone to 2-hydroxyethyl acrylate or methacrylate, glycidyl acrylate, glycidyl methacrylate, acrylamide, methacrylamide, N-methylolacrylamide, polyhydric alcohol (meth)acrylates and the like. The other ethylenically unsaturated monomer copolymerizable with these includes styrene, α-methylstyrene, itaconic acid, maleic acid, vinyl acetate and the like.

The polyester resins include saturated polyester resins and unsaturated polyester resins, and these can be obtained by condensation under heating of a polybasic acid with a polyhydric alcohol. The polybasic acid may be a saturated basic acid or unsaturated basic acid. The saturated polybasic acid includes, among others, phthalic anhydride, terephthalic acid and succinic acid, and the unsaturated polybasic acid includes, among others, maleic acid, maleic anhydride and fumaric acid. Usable as the polyhydric alcohol are dihydric alcohols and trihydric alcohols. Examples of the dihydric alcohols are ethylene glycol and diethylene glycol, and examples of the trihydric alcohols are glycerol and trimethylolpropane.

Usable as the alkyd resins are those obtained by reacting a modifier, such as an oil or fat or fatty acid (e.g. soybean oil, linseed oil, coconut oil, stearic acid) or a natural resin (e.g. rosin, amber), with such a polybasic acid as mentioned above and such a polyhydric alcohol as mentioned above.

Usable as the fluororesins are vinylidene fluoride resins, tetrafluoroethylene resins, mixtures of these, and resins comprising various fluorine-containing copolymers obtained by copolymerizing a fluoroolefin, a hydroxyl-containing polymerizable compound and another copolymerizable vinyl compound monomer.

As examples of the epoxy resins, there may be mentioned resins obtained by reacting a bisphenol with epichlorohydrin, and the like. The bisphenol includes bisphenol A, and bisphenol F, among others. As examples of such bisphenol-based epoxy resins, there may be mentioned "Epikote 828™", "Epikote 1001™", "Epikote 1004™", "Epikote 1007™" and "Epikote 1009™", (all being products of Shell Chemical), and chain extension products derived from these using an appropriate chain extender can also be used.

As the polyurethane resins, there may be mentioned urethane bond-containing resins obtained from various polyol components, such as acrylic, polyester, polyether, polycarbonate or like polyols, and polyisocyanate compounds. As the polyisocyanates, there may be mentioned 2,4-tolylene diisocyanate (2,4-TDI), 2,6-tolylene diisocyanate (2,6-TDI), mixture of these (TDI), diphenylmethane-4,4'-diisocyanate (4,4'-MDI), diphenylmethane-2,4'-diisocyanate (2,4'-MDI), mixtures of these (MDI), naphthalene-1,5-diisocyanate (NDI), 3,3'-dimethyl-4,4'-biphenylene diisocyanate, xylylene diisocyanate (XDI), dicyclohexylmethanediisocyanate (hydrogenated HDI), isophoronediisocyanate (IPDI), hexamethylene diisocyanate (HDI), hydrogenated xylylene diisocyanate (HXDI) and the like.

The polyether resins are ether linkage-containing polymers or copolymers and include polyoxyethylene polyethers, polyoxypropylene polyethers, polyoxybutylene polyethers, polyether resins having at least two hydroxyl groups per molecule, such as polyethers derived from aromatic polyhydroxy compounds, e.g. bisphenol A, bisphenol F, etc. Also usable are those carboxyl-containing polyether resins obtained by reacting the above polyether resins with a polybasic carboxylic acid, such as succinic acid, adipic acid, sebacic acid, phthalic acid, isophthalic acid, terephthalic acid and trimellitic acid, or with a reactive derivative thereof, such as an acid anhydride.

The clear coating composition described in Japanese Kokoku Publication Hei-08-19315 and comprising a carboxyl-containing polymer and a glycidyl-containing polymer is preferably used from the viewpoint of measures against acid rain and in view of its inability to disturb the luster pigment or luster agent orientation in metallic base coating films upon application thereof when making the difference in solubility from the metallic base coating films wide in applying the same by the wet-on-wet (W/W) technique.

The proportion of the above crosslinkable coating film-forming resin to the crosslinking agent is preferably such that the crosslinkable coating film-forming resin amounts to 90 to 50 parts by mass and the crosslinking agent to 10 to 50 parts by mass, per 100 parts of the sum thereof on the solid basis. More preferably, the crosslinkable coating film-forming resin amounts to 85 to 60 parts by mass and the crosslinking agent to 15 to 40 parts by mass. If the crosslinking agent amounts to less than 10 parts by mass, the crosslinking in the coating films may fail to proceed to a sufficient extent. If, conversely, the crosslinking agent amounts to more than 50 parts by mass, the storable stability of the coating composition will decrease and the rate of curing increases, possibly leading to impairment in coating film appearance. In the scope of the first aspect of the invention, the above (A) components crosslinkable coating film-forming resin and crosslinking agent do not fall under the (B) component ladder silicone copolymer described in the following.

The above-mentioned (B) component ladder silicone copolymer can be obtained by copolymerizing (b-1) a (meth)acryloxyalkyl group-containing ladder silicone oligomer, (b-2) a crosslinkable functional group-containing ethylenically unsaturated monomer and, where necessary, (b-3) another copolymerizable ethylenically unsaturated monomer.

The (meth)acryloxyalkyl-containing ladder silicone oligomer (b-1) contains (meth)acryloxyalkyl groups in side chain groups thereof. Alkyl groups containing 1 to 18 carbon atoms, substituted alkyl groups, a phenyl group and substituted phenyl groups can be used as substituents in addition to the (meth)acryloxyalkyl groups. A small proportion of a glycidyl group or and/or an amino group may be introduced in the side chain groups.

The ladder silicone oligomer (b-1) mentioned above has number average molecular weight of 500-5000 and is an intermediate for the resin formation which has the ladder structure represented by the following formula;

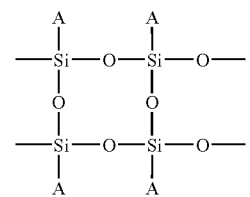

wherein 97 to 20 mole % of A's correspond to at least one group selected from a hydrogen atom, alkyl groups containing 1 to 18 carbon atoms, substituted alkyl groups, a phenyl group and substituted phenyl groups, while 3 to 80 mole % of A's correspond to at least one reactive substituted group selected from vinyl groups, (meth)acrylic groups and (meth)acryloxyalkyl groups, and a (meth)acryloxyalkyl group is an essential component.

The crosslinkable functional group-containing ethylenically unsaturated monomer (b-2) comprises said crosslinkable functional group which the above (A) component crosslinkable coating film-forming resin has, preferably one or a plurality of ethylenically unsaturated monomers having a hydroxyl, carboxyl, acid anhydride, glycidyl or amine or isocyanate group.

The hydroxyl-containing monomer includes hydroxyethyl acrylate, hydroxypropyl acrylate, hydroxyethyl methacrylate, hydroxypropyl methacrylate and the like. The carboxyl-containing monomer includes acrylic acid, methacrylic acid, itaconic acid, fumaric acid and the like. The acid anhydride group-containing monomer includes maleic anhydride, itaconic anhydride and the like. The glycidyl-containing monomer includes glycidyl acrylate, glycidyl methacrylate and the like. The amine group-containing monomer includes an aliphatic, alicyclic, aromatic or cyclic amine having a primary, secondary and/or ternary amine, e.g. acrylamide, methacrylamide, methylolacrylamide, methylolmethacrylamide, alkoxymethylolacrylamides, alkoxymethylolmethacrylamides, dimethylaminoethylmethacrylamide, dimethylaminoethylmethacrylamide, tributylaminoethylmethacrylamide, oxazolidinoethyl methacrylate, 3-aminopropyl methacrylate, 2-isopropenyl-2-oxazoline, dimethylaminoethyl methacrylate and the like. The isocyanate-containing monomer includes aromatic diisocyanates, such as tolylene diisocyanate, phenylene diisocyanate, naphthalenediisocyanate, etc., aliphatic diisocyanates, such as tetramethylene diisocyanate, HDI, lysine-diisocyanate, etc, araliphatic diisocyanates, such as xylenediisocyanate, tetramethylxylenediisocyanate, and alicyclic diisocyanates, such as isophoronediisocyanate, hydrogenated tolylene diisocyanate, etc. Preferred among them are hydroxyl- or glycidyl-containing monomers.

The above copolymerizable ethylenically unsaturated monomer (b-3) is used according to need and this monomer comprises one or a plurality of methyl, ethyl, propyl, n-butyl, isobutyl, tert-butyl, 2-ethylhexyl, lauryl, phenyl, benzyl styrene, α-methylstyrene, vinyl acetate and divinylbenzene esters of acrylic or methacrylic acid and the like.

In the above component (B), the proportions of the components (b-1) and (b-2) and the component (b-3) to be used according to need are such that the component (b-1) amounts to 1 to 30% by mass, the component (b-2) to 1 to 50% by mass and the component (b-3) to 1 to 90% by mass. If the component (b-1) amounts to less than 1% by mass or the component (b-2) to less than 1% by mass, the crosslinking reaction can proceed only to an insufficient extent in the coating films and, therefore, wiping with an organic solvent may possible cause dissolution of the coating films. If the proportion of component (b-1) exceeds 30% by mass or that of component (b-2) exceeds 50% by mass, there arises the possibility of the coating films formed being poor in gloss. In this specification, the formulation ratios of monomers represent those of respective monomers per 100% by mass of the sum of monomers.

The number average molecular weight of the resulting (B) ladder silicone copolymer is preferably 500 to 8000, more preferably 1000 to 5000.

In the clear coating composition according to the first aspect of the invention, there may be incorporated, where necessary, a color pigment and/or an extender pigment each at an addition amount not impairing the transparency thereof. The composition may further contain, in addition to the components mentioned above, one or more of polyamide waxes, which are lubricating dispersions of aliphatic amides, polyethylene waxes, which are colloidal dispersions mainly comprising oxidized polyethylene, curing catalysts, ultraviolet absorbers, antioxidants, leveling agents, surface modifiers such as silicones and organic macromolecules, antisagging agents, thickeners, antifoaming agents, lubricants, crosslinking polymer particles (microgels) and so forth, each in an appropriate amount. By incorporating these additives at an addition amount not exceeding 15 parts by mass per 100 parts by mass of the vehicle (on the solid basis), it is generally possible to improve the performance characteristics of the coatings or coating films.

The clear coating composition according to the first aspect of the invention is generally prepared by dissolving or dispersing the above constituents in a solvent. The organic solvent may be any one provided that it dissolves or disperse the vehicle. Thus, it may be an organic solvent and/or water. The organic solvent includes those generally used in the field of coatings, for example hydrocarbons such as toluene and xylene, ketones such as acetone and methyl ethyl ketone, and esters and alcohols such as ethyl acetate, butyl acetate, cellosolve acetate and butylcellosolve. In cases that the use of organic solvents is to be restrained from the environmental protection viewpoint, water is preferably used. In that case, an appropriate amount of a hydrophilic organic solvent may be contained in water.

The clear coating composition according to the second aspect of the invention is excellent in the above-mentioned stain resistance and acid resistance. In the following, the constitution and effects of the clear coating composition according to the second aspect of the invention are described in detail.

The carboxyl- and carboxylate ester group-containing polymer (C) to be used in the clear coating composition according to the second aspect of the invention is a half ester group-containing polymer obtainable by reacting an acid anhydride group-containing polymer with a monohydric alcohol.

The acid anhydride group-containing polymer can be obtained by copolymerizing 15 to 40% by mass, preferably 15 to 30% by mass, of an acid anhydride group-containing ethylenically unsaturated monomer (c-1) with 60 to 85% by mass, preferably 70 to 85% by mass, of another copolymerizable ethylenically unsaturated monomer (c-2). If the amount of the acid anhydride group-containing ethylenically unsaturated monomer (c-1) is less than 15% by mass, insufficient curability will result. If it exceeds 40% by mass, the resulting coating films will unfavorably become hard and brittle and unsatisfactory in weathering resistance.

Examples of the acid anhydride group-containing ethylenically unsaturated monomer (c-1) are itaconic anhydride, maleic anhydride and citraconic anhydride, among others. The other copolymerizable ethylenically unsaturated monomer (c-2) is not particularly restricted unless the acid anhydride group is not adversely affected. The monomer (c-2) preferably has one ethylenically unsaturated bond and contains 3 to 15 carbon atoms, more preferably 2 to 12 carbon atoms.

As examples of the other copolymerizable ethylenically unsaturated monomer (c-2), there may be mentioned such ethylenically unsaturated monomers as styrene and styrene derivatives, such as a-methylstyrene and p-tert-butylstyrene, (meth)acrylate esters (e.g. methyl(meth)acrylate, ethyl (meth)acrylate, propyl(meth)acrylate, n-, iso- and tert-butyl (meth)acrylate, 2-ethylhexyl(meth)acrylate, lauryl (meth) acrylate, cyclohexyl(meth)acrylate, isobornyl (meth)acrylate, Shell's "VeoVa-9™" and "VeoVa-10™", and the like. Carboxyl-containing monomers such as acrylic acid and methacrylic acid can also be used. In cases that styrene or a derivative thereof is used as the copolymerizable ethylenically unsaturated monomer, it is particularly preferable to use the same in an amount of 5 to 40% by mass.

The copolymerization for producing the above acid anhydride group-containing polymer is carried out by a per se known method, for example by radical polymerization or like solution polymerization. Thus, for example, it can be carried out at a polymerization temperature of 100 to 150° C. for a polymerization period of 3 to 8 hours. An azo or peroxide initiator is properly used as the polymerization initiator. Another additive, for example a chain transfer agent, may also be used. The acid anhydride group-containing polymer preferably has a number average molecular weight of 1,500 to 8,000, more preferably 2,000 to 5,000. When the number average molecular weight exceeds 8,000, the polymer viscosity becomes excessively high, hence it becomes difficult to prepare a high-solid-content clear coating composition. If the number average molecular weight is below 1,500, the resulting clear coating composition will become unsatisfactory in curability. The molecular weights of polymers as referred to herein are values determined by the GPC (gel permeation chromatography) method.

The acid anhydride group-containing polymer has, on the average, at least two, preferably 2 to 15, acid anhydride groups per molecule. If the number of acid anhydride groups per molecule is less than 2, the resulting clear coating composition will show insufficient curability. If it exceeds 15, the polymer will become hard and brittle, hence insufficient weathering resistance will result.

The acid anhydride group-containing polymer obtained is then reacted with a monohydric alcohol (c-3) in mole ratio between an acid anhydride group and hydroxyl group of 1/10 to 1/1, preferably 1/8 to 1/1.1, more preferably 1/1.5 to 1/1.3, whereby the polymer (C) having carboxyl groups and carboxylate ester groups is prepared. If the amount of the alcohol is smaller than 1/10, the excess alcohol, which is too abundant, may cause foaming in the step of curing and, if larger than 1/1, unreacted acid anhydride groups remain and may cause decreases in storage stability.

The above-mentioned monohydric alcohol is a low-molecular compound containing 1 to 12, preferably 1 to 8, carbon atoms so that the alcohol can favorably evaporate upon heating to regenerate the acid anhydride group. The monohydric alcohol includes methanol, ethanol, n-propanol, isopropanol, n-butanol, isobutanol, tert-butanol, methylcellosolve, ethylcellosolve, dimethylaminoethanol, diethylaminoethanol, acetol, allyl alcohol and propargyl alcohol, among others. Acetol, allyl alcohol, propargyl alcohol and methanol are particularly preferred, however.

The content of polymer (C) is 20 to 60% by mass based on the total mass of solids in the resin composition. If the content of polymer (C) is less than 20% by mass, insufficient curability results, hence the coating films formed will be poor in hardness. When it is above 60% by mass, the water resistance will be decreased. A content of 25 to 50% by mass is preferred.

The hydroxyl- and epoxy-containing polymer (D) to be used in the clear coating composition according to the second aspect of the invention preferably has, on the average, 2 to 10, more preferably 3 to 8, epoxy groups per molecule and preferably has, on the average, 2 to 12, more preferably 4 to 10, hydroxyl groups per molecule. The epoxy equivalent thereof is preferably 100 to 800, more preferably 200 to 700, and the hydroxyl equivalent thereof is preferably 200 to 1,200, more preferably 400 to 1,000. If the epoxy equivalent is above the above-specified upper limit, the curability of the clear coating composition will be insufficient. If it is below the lower limit, the resulting coating films will unfavorably become hard and brittle. When the hydroxyl equivalent is less than 200, the water resistance of the resulting cured coating films will be unsatisfactory. When it exceeds 1,200, the curability will unfavorably become insufficient.

The above polymer (D) can be obtained by copolymerizing, for example, 5 to 60% by mass, preferably 15 to 30% by mass, of a hydroxyl-containing ethylenically unsaturated monomer (d-1) having the structure of the formula (1):

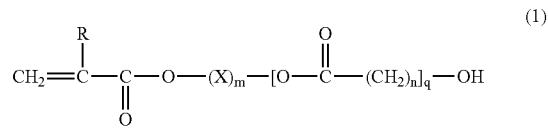

wherein R is a hydrogen atom or a methyl group, X is a straight or branched alkylene or hydroxyalkylene group, m is an integer of 2 to 8, n is an integer of 3 to 7 and q is an integer of 0 to 4, 10 to 60% by mass, preferably 15 to 50% by mass, of an epoxy-containing ethylenically unsaturated monomer (d-2), and, where necessary or appropriate, 0 to 85% by mass, preferably 10 to 60% by mass, of another copolymerizable ethylenically unsaturated monomer (d-3). When the proportion of the hydroxyl-containing ethylenically unsaturated monomer (d-1) is less than 5% by mass, the curability will be insufficient while a proportion exceeding 60% by mass is undesirable, since the compatibility will then become insufficient, hence the reaction will not proceed to a satisfactory extent. When the proportion of the epoxy-containing ethylenically unsaturated monomer (d-2) is less than 10% by mass, curability will be insufficient while a proportion exceeding 60% by mass is undesirable, for it will lead to excessive hardness and, hence, poor weathering resistance.

If the hydroxyl-containing alkyl chain, namely the group represented by $—(X)_m—[OCO(CH_2)_n]_q—OH$, of the hydroxyl-containing ethylenically unsaturated monomer (d-1) which can be used in preparing the polymer (D) is excessively short in chain length, the flexibility in the vicinity of a site of crosslinking will be lost, hence the polymer will become hard. When it is excessively long, the molecular weight between two crosslinking sites tends to become excessively high. Thus, the hydroxyl-containing alkyl chain preferably contains 4 to 20 carbon atoms, more preferably 4 to 10 carbon atoms. More specifically, there may be mentioned 4-hydroxybutyl (meth)acrylate and 6-hydroxyhexyl(meth)acrylate, the products of reaction thereof with ε-caprolactone, the product of reaction of 2-hydroxyethyl(meth)acrylate with ε-caprolactone, and like compounds. Such compounds are also commercially available on the market, including, for example, "Placcel FM 1™" and "Placcel FA 1™" (both being products of Daicel Chemical Industries). Such compounds can also be prepared by esterifying (meth)acrylic acid with a large excess (e.g. not less than 1.5 moles per mole of the acid) of a diol (e.g. 1,4-butane diol, 1,6-hexanediol).

As the epoxy-containing ethylenically unsaturated monomer (d-2), there may be mentioned, among others, glycidyl (meth)acrylate and 3,4-epoxycyclohexanylmethyl (meth) acrylate.

As the other copolymerizable ethylenically unsaturated monomer (d-3), there may be mentioned those monomers specifically mentioned hereinabove referring to the "other copolymerizable ethylenically unsaturated monomer (c-2)" to be used in preparing the acid anhydride group-containing polymer (c-1).

The copolymerization for preparing the polymer (D) can be carried out in the same manner as in preparing the polymer (C). The polymer (D) obtained preferably has a number average molecular weight of 500 to 8,000, more preferably 1,500 to 5,000.

The content of the polymer (D) is 0.1 to 60% by mass relative to the total solid matter of the resin composition. If the amount of polymer (D) is less than 0.1% by mass, the resulting coating films may fail to show the desired performance characteristics. When it exceeds 60% by mass, the water resistance will decrease. An amount of 5 to 50% by mass is preferred.

The hydroxyl-, epoxy- and ladder silicone-containing polymer (E) to be used in the clear coating composition according to the second aspect of the invention can be obtained by partly reacting the above polymer (D) with a (meth)acryloxyalkyl-containing ladder silicone oligomer (e-3). As the above-mentioned monomers (e-1), (e-2) and (e-4), there can be mentioned the same as the above-mentioned monomers (d-1), (d-2) and (c-2), respectively.

The above-mentioned (meth)acryloxyalkyl-containing ladder silicone oligomer (e-3) contains (meth)acryloxyalkyl groups on side chain groups. Usable as other substituents than (meth)acryloxyalkyl groups are those containing 1 to 18 carbon atoms, substituted alkyl groups, phenyl and substituted phenyl groups. A small proportion of a glycidyl or amino group may be introduced into side chain groups.

The proportions of the components (e-1), (e-2) and (e-3) and the component (e-4) to be used when necessary in producing the polymer (E) are such that the component (e-1) amounts to 5 to 60% by mass, the component (e-2) to 10 to 60% by mass, the component (e-3) to 1 to 30% by mass and the component (e-4) to 0 to 85% by mass. If the proportion of component (e-1) is less than 5% by mass, insufficient curability will result. If it exceeds 60% by mass, insufficient compatibility will result, hence the reaction will not proceed to a satisfactory extent. If the proportion of component (e-2) is less than 10% by mass, poor curability will result and, if it exceeds 60% by mass, the polymer will become excessively hard and will have poor weathering resistance. If the proportion of component (e-3) is less than 1% by mass, poor stain resistance will result and, if it exceeds 30% by mass, the reaction will not proceed homogeneously, hence the resulting coating films will be turbid.

The copolymerization for producing the polymer (E) can be carried out in the same manner as in producing the polymer (C). The polymer obtained preferably has a number average molecular weight of 500 to 8,000, more preferably 1,500 to 5,000.

The content of polymer (E) is 0.01 to 60% by mass relative to the total solid matter of the resin composition. If the content of polymer (E) is less than 0.01% by mass, the stain resistance will decrease and, if it exceeds 60% by mass, the surface of coating films formed will become uneven, hence the appearance of the coating films will become poor. A content of 0.1 to 50% by mass is preferred.

A hydroxyl- and carboxyl-containing polymer (G) can optionally be used in the clear coating composition according to the second aspect of the invention. This polymer is obtainable by copolymerization of a mixture of (g-1) a carboxyl-containing ethylenically unsaturated monomer and (g-2) a hydroxyl-containing ethylenically unsaturated monomer, and optionally (g-3) another copolymerizable ethylenically unsaturated monomer.

A mixture of a carboxyl-containing ethylenically unsaturated monomer (g-1) and a hydroxyl-containing ethylenically unsaturated monomer (g-2), which is used for carboxyl group introduction in the polymer (G) is obtainable by half-esterifying a hydroxyl-containing ethylenically unsaturated monomer having a structure represented by the formula (3):

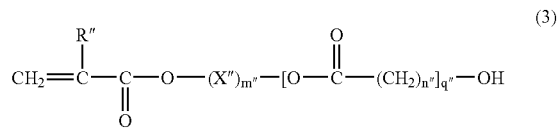

wherein R" is a hydrogen atom or a methyl group, X" is a straight or branched alkylene or hydroxyalkylene group, m" is an integer of 2 to 8, preferably 2 to 6, n" is an integer of 3 to 7, preferably 3 to 5, and q" is an integer of 0 to 4, preferably 0 to 2, with an acid anhydride group-containing compound. The above monomer (g-1) is used for the carboxyl group introduction in the above polymer (G).

The hydroxyl-containing alkyl chain of the hydroxyl-containing ethylenically unsaturated monomer (g-2) preferably contains 4 to 20 carbon atoms, more preferably 4 to 10 carbon atoms, since if the chain length is excessively short, the flexibility in the vicinity of a site of crosslinking will be lost and the polymer will become excessively hard and, if it is excessively long, the molecular weight between two crosslinking sites will become excessively high. Specifically, those compounds and the method of preparation mentioned hereinabove referring to the monomer (d-1) can be used.

The above-mentioned acid anhydride group-containing compound is not particularly restricted but may be any compound capable of giving a carboxyl function-containing compound by reacting with a hydroxyl group under ordinary reaction conditions, for example at room temperature to 120° C. and at ordinary pressure. Here, the use of an acid anhydride group-containing compound containing 8 to 12 carbon atoms, preferably 8 to 10 carbon atoms, and having a cyclic (saturated or unsaturated) group is preferred since the resin shows good compatibility. As specific preferred examples of the acid anhydride, there may be mentioned hexahydrophthalic anhydride, phthalic anhydride, 4-methylhexahydrophthalic anhydride, tetrahydrophthalic anhydride, trimellitic anhydride and the like.

The half esterification reaction between the hydroxyl-containing ethylenically unsaturated monomer and the acid anhydride group-containing compound can be occurred in the conventional manner, for example at a temperature between room temperature and 120° C. On that occasion, the hydroxyl-containing ethylenically unsaturated monomer is preferably used in excess so that no acid anhydride group may remain unreacted.

As the other copolymerizable ethylenically unsaturated monomer (g-3), there can be mentioned the same as the above-mentioned monomer (c-2). As preferred monomer, there may be mentioned monomers having one ethylenically unsaturated bond and containing 3 to 15, preferably 2 to 12 carbon atoms. Further, hydroxyl-containing ethylenically unsaturated monomers and carboxyl-containing ethylenically unsaturated monomers may also be used.

By adding and subjecting an excess of the hydroxyl-containing ethylenically unsaturated monomer, which is required on the occasion of copolymerization, in addition to the amount thereof required for half esterification to half esterification with the acid anhydride group-containing compound, it is possible to obtained a monomer mixture comprising the corresponding carboxyl-containing ethylenically unsaturated monomer (g-1) and the hydroxyl-containing ethylenically unsaturated monomer (g-2). In this case, it is generally preferable to react the hydroxyl-containing ethylenically unsaturated monomer with the acid anhydride group-containing compound in a mole ratio between hydroxyl group and acid anhydride group of 1/0.9 to 1/0.5, more preferably 1/0.8 to 1/0.5. If this mole ratio is less than 1/0.9, a longer period of time is required for the half esterification, possibly causing gelation. If it exceeds 1/0.5, the amount of carboxyl groups becomes excessively small, hence poor curability will unfavorably result.

The polymer (G) is produced using 20 to 100% by mass, preferably 40 to 80% by mass, of the monomer mixture and 0 to 80% by mass, preferably 20 to 60% by mass, of the other copolymerizable ethylenically unsaturated monomer (g-3).

When the above-mentioned monomer mixture is used in an amount less than 20% by mass, poor curability unfavorably results.

The copolymerization for producing the polymer (G) can be carried out in the same manner as the polymer (C). The polymer obtained preferably has a number average molecular weight of 500 to 8,000, more preferably 1,500 to 5,000.

A polymer (H) which can further be used in the clear coating composition of the second aspect of the invention where necessary is a fluoropolymer obtainable by copolymerizing 5 to 60% by mass of (h-1) a trifluoromonochloroolefin and/or a tetrafluoroolefin, 5 to 20% by mass of (h-2) a hydroxyalkyl vinyl ether, 5 to 40% by mass of (h-3) cyclohexyl vinyl ether, 5 to 20% by mass of (h-4) an alkyl vinyl ether and 0 to 40% by mass of (h-5) a glycidyl-containing radical-polymerizable monomer and/or a carboxyl- or acid anhydride group-containing polymerizable monomer.

The polymer (H) preferably has a number average molecular weight of 3,000 to 10,000. It is preferred that the (h-1) trifluoromonochloroolefin and/or tetrafluoroolefin content in the above copolymer is generally 40 to 60 mole percent. Said content less than 40 mole percent is not only undesirable from the weathering resistance and water repellency viewpoint but also causative of troubles from the production viewpoint. Said content exceeding 60 mole percent makes the copolymer production difficult.

The hydroxyalkyl vinyl ether (h-2) content in the above copolymer is generally 3 to 15 mole percent. A hydroxyalkyl vinyl ether (h-2) content exceeding 15 mole percent influences the solubility of the copolymer and makes the copolymer only soluble in alcohols and like specific solvents and further shortens the pot life and thus markedly impairs the applicability of the coating. If the hydroxyalkyl vinyl ether (h-2) content in the above copolymer is less than 3 mole percent, poor curability will result, prolonging the time required for curing and causes decreases in solvent resistance and stain resistance, among others, of cured coatings.

The cyclohexyl vinyl ether (h-3) content in the above copolymer is generally 3 to 15 mole percent. When said cyclohexyl vinyl ether (h-3) content is less than 3 mole percent, the resulting coating films will show decreased hardness while a content exceeding 15 mole percent is unfavorable since the weathering resistance decreases and cracking readily occurs.

Preferred as the alkyl vinyl ether (h-4) are alkyl vinyl ethers whose alkyl moiety is straight or branched and contains 2 to 8, more preferably 2 to 4 carbon atoms, such as ethyl vinyl ether, isobutyl vinyl ether and n-butyl vinyl ether.

The alkyl vinyl ether (h-4) content of the above copolymer is generally 3 to 15 mole percent. An alkyl vinyl ether (h-4) content less than 3 mole percent will lead to decreased flexibility and a content exceeding 15 mole percent will unfavorably cause decreases in the hardness of coating films.

The glycidyl-containing polymerizable monomer among the above-mentioned optional constituents includes glycidyl methacrylate, glycidyl acrylate, allyl glycidyl ether and the like while the carboxyl- or acid anhydride group-containing polymerizable monomer includes those monomers mentioned hereinabove referring to the above (b-2) and those monomers mentioned hereinabove referring to the above (c-1). The content of the glycidyl-containing polymerizable monomer or acid anhydride group-containing polymerizable monomer in the above copolymer is generally 5 to 40 mole percent. A glycidyl-containing polymerizable monomer and/or carboxyl- or acid anhydride group-containing polymerizable monomer content less than 5 mole percent will lead to insufficient curability. A content exceeding 40 mole percent is also unfavorable since the coating films become too hard and the weathering resistance decreases.

The clear coating composition according to the third aspect of the invention is a clear coating composition excellent in stain resistance and non-sanding recoatability. The concrete constitution and effects of the clear coating composition according to the third aspect of the invention are now described.

The carboxyl- and carboxylate ester group-containing polymer (C) to be used in the clear coating composition according to the third aspect of the invention can be the same as the carboxyl- and carboxylate ester group-containing polymer (C) to be used in the clear coating composition according to the second aspect of the invention.

The hydroxyl- and epoxy-containing polymer (D) to be used in the clear coating composition according to the third aspect of the invention may be the same as the hydroxyl- and epoxy-containing polymer (D) to be used in the clear coating composition according to the second aspect of the invention.

In the third aspect of the invention, the content of polymer (D) is 10 to 60% by mass relative to the total solid matter of the resin solid. If the polymer (D) content is less than 10% by mass, the resulting coating films may fail to acquire satisfactory performance characteristics in certain cases. At a content exceeding 60% by mass, decreased water resistance results. A preferred content is 20 to 50% by mass.

The hydroxyl-, epoxy- and ladder silicone-containing polymer (E) to be used in the clear coating composition according to the third aspect of the invention may be the same as the hydroxyl-, epoxy- and ladder silicone-containing polymer (E) to be used in the clear coating composition according to the second aspect of the invention.

In the third aspect of the invention, the content of polymer (E) is 0.1 to 25% by mass relative to the total solid matter of the resin solid. A polymer (E) content less than 0.1% by mass will lead to decreased stain resistance. When that content exceeds 25% by mass, the surface of coating films becomes uneven and the appearance of coating films becomes poor. A preferred content is 10 to 20% by mass.

As the polyethylene oxide- or polypropylene oxide-modified polysilicone compound (F) to be used in the clear coating composition according to the third aspect of the invention, there may be mentioned polyethylene oxide- or polypropylene oxide-modified polydimethylsilane and, further, those having phenyl groups in lieu of methyl groups, and those having longer carbon chain alkyl groups than methyl group, such as alkyl groups containing 2 to 8 carbon atoms, in lieu of methyl groups.

The polyethylene oxide- or polypropylene oxide-modified polysilicone compound (F) is used preferably in an amount of 0.02 to 1 part by mass (on the solid basis) per 100 parts by mass (on the solid basis) of the sum of (C), (D) and (E). If the amount of (F) is less than 0.02 part by mass (on the solid basis), the desired non-sanding recoatability may not be obtained to a satisfactory extent. An amount exceeding 1 part by mass (on the solid basis) may possibly lead to poor appearance. A more preferred amount is 0.05 to 0.5 part by mass (on the solid basis) per 100 parts by mass (on the solid basis) of the sum of (C), (D) and (E).

Also usable as the polyethylene oxide- or polypropylene oxide-modified polysilicone compound (F) are such commercial products as "Silwet L-7001™" and "Silwet FZ-2120™" (both being products of Nippon Unicar) as well as "BYK 341™", "BYK 344™", "BYK 306™", "BYK 325™", "BYK 320™", "BYK 300™", "BYK 302 ™", "BYK 330™", "BYK 333™", "BYK 335™" and "BYK 370™" (all being products of BYK Chemie Japan).

The hydroxyl- and carboxyl-containing polymer (G), which can be used in the clear coating composition according to the third aspect of the invention, may be the same as the hydroxyl- and carboxyl-containing polymer (G) to be used in the clear coating composition according to the second aspect of the invention.

In the second and third aspects of the invention, the content of polymer (G) is 5 to 50% by mass relative to the sum of the polymers (C), (D) and (E) on the solid basis or the sum of the polymers (C), (D), (E) and (F) on the solid basis. A polymer (G) content less than 5% by mass will lead to the formation of coating films having insufficient scratch resistance. A higher content than 50% by mass will lead to the formation of coating films having insufficient hardness. A content of 5 to 20% by mass is preferred.

The polymer (H), which can be used in the clear coating composition according to the third aspect of the invention, may be the same as the polymer (H) to be used in the clear coating composition according to the second aspect of the invention.

In the second and third aspects of the invention, the content of polymer (H) is preferably 2 to 50 % by mass relative to the sum of the polymers (C), (D) and (E) on the solid basis, the sum of the polymers (C), (D), (F) and (F) on the solid basis, the sum of the polymers (C), (D), (E) and (G) on the solid basis or the sum of the polymers (C), (D), (E), (F) and (G) on the solid basis. If the polymer (H) content is less than 2 % by mass, the resulting coatings may have insufficient weathering resistance. At addition amounts exceeding 50% by mass, any extra effects proportional to the increment in addition amount will no longer be produced. A preferred content is 3 to 25% by mass.

The clear coating composition according to the second or third aspect of the invention is preferably formulated so that the mole ratio between carboxyl and epoxy groups amounts to 1/1.2 to 1/0.6, more preferably 1/1.0 to 1/0.8, and the mole ratio between carboxyl and/or carboxylate ester group and hydroxyl group amounts to 1/1.5 to 1/0.5.

When the ratio between carboxyl and epoxy groups exceeds 1/0.6, the resulting resin tends to show decreased curability. Conversely, when it is less than 1/1.2, the resulting coating films unfavorably show a tendency toward yellowing. If the mole ratio between carboxyl and/or carboxylate ester group and hydroxyl group exceeds 1/0.5, the resulting resin shows decreased curability and, if it is less than 1/1.5, there results an excess of hydroxyl groups, unfavorably causing a tendency toward decreased water resistance.

A curing catalyst generally used for the esterification reaction between an acid and an epoxy, for example a quaternary ammonium salt, can be incorporated in the resins of the clear coating composition according to the second or third aspect of the invention. As specific examples of the catalyst, there may be mentioned benzyltriethylammonium chloride or bromide, tetrabutylammonium chloride or bromide, salicylate or glycolate, or p-toluenesulfonate, and the like. These catalysts may also be used in admixture. The addition amount of the above catalyst is not particularly restricted but, generally, it is preferably within the range of 0.1 to 2.0% by mass relative to the total solid matter of the clear coating composition. A tin catalyst may also be used in combination with these. The tin catalyst is, for example, dimethyltin bis(methyl maleate), dimethyltin bis(ethyl maleate), dimethyltin bis(butyl maleate), dibutyltin bis(butyl maleate) or the like. The curing catalyst and the tin compound are used preferably in a ratio of 1/4 to 1/0.2 by mass.

In the second and third aspects of the invention, a melamine-formaldehyde resin and/or a blocked polyisocyanate may be added to the above resin components to thereby improve the crosslink density and the water resistance. Further, for improving the weathering resistance, an ultraviolet absorber and a hindered amine light stabilizer, an antioxidant and so on may also be added. Further, crosslinked resin particles may be added as a rheology controlling agent, a surface modifier maybe added for appearance modification, and/or an antifoaming agent may be added for preventing foaming. Furthermore, an alcohol solvent (e.g. methanol, ethanol, propanol, butanol), a hydrocarbon solvent, an ester solvent or a like solvent may be used as a diluent for viscosity adjustment.

The coating composition according to the second or third aspect of the invention, which contains a resin having acid groups as functional groups, can be neutralized with an amine to give a water-based resin composition in which water serves as a medium.

Method of Forming a Coating Film and Multilayer Coating Film

The method of forming a coating film according to the first, second or third aspect of the invention comprises forming a metallic or solid base coating film on a substrate directly or via an undercoating film, then forming a clear coating film using the clear coating composition according to the first, second or third aspect of the invention without curing the metallic or solid base coating film, and subjecting the metallic or solid base coating film and the clear coating film simultaneously to drying and baking.

When the article to be coated, namely substrate, is an automotive body or part, the substrate is preferably subjected in advance to chemical conversion treatment and then provided with an undercoat by electrodeposition coating or the like or by intermediate coating film, for instance. The intermediate coating is performed for hiding the substrate, providing chipping resistance and securing adhesiveness to the topcoat. The intermediate coating film is formed using an ordinary intermediate coating, which maybe an organic solvent-based one, a water-based one or a powder coating.

When the metallic base coating films have transparency, the metallic base coating films, together with the intermediate coating films, can produce composite colors to thereby improve the decorativeness. In this case, the intermediate coating films are formed by using a gray or colored intermediate coating.

The multilayer coating films according to the first, second or third aspect of the invention can be formed on various substrates. As specific substrates, there may be mentioned, among others, metals such as iron, aluminum, copper, and alloys thereof, inorganic materials such as glass, cement and concrete, plastic materials such as polyethylene resins, polypropylene resins, ethylene-vinyl acetate copolymer resins, polyamide resins, acrylic resins, vinylidene chloride resins, polycarbonate resins, polyurethane resins, epoxy resins and like resins as well as various fiber-reinforced plastics (FRPs), wood or timber, fibrous materials (paper, cloths, etc.) and other natural or synthetic materials. In the present specification, those materials subjected to chemical conversion treatment and/or provided with an undercoat formed by undercoating or intermediate coating are sometimes referred to also as "substrates".

A base coating film is formed on the above-mentioned substrate by applying a base coating. In this base coating film formation, a metallic base coating containing a luster pigment or a solid base coating containing a color pigment, which is generally used for base coating film, can be used. The crosslinkable coating film-forming resin to be used as the vehicle in the base coating, the crosslinking agent to be used where necessary, and the proportions of these are the same as in the clear coating according to the first aspect of the present invention. The base coating is prepared as an ordinary topcoat base coating and may be an organic solvent-based one, a water-based one or a powder coating composition.

The metallic base coating contains various luster pigments. As examples of the luster pigments, there may be mentioned aluminum flake pigments, colored aluminum flake pigments, metal oxide-coated alumina flake pigments, interfering mica pigments, colored mica pigments, metal oxide-coated glass flakes, metal-plated glass flakes, metal oxide-coated silica flake pigments, metallic titanium flakes, graphite, stainless steel flakes, sheet-like iron oxide, phthalocyanine flakes and holographic pigments, among others.

Even in the metallic base coating, a color pigment, which is to be used in the solid base coating, maybe used, if necessary, in combination with the luster pigment. As the color pigment, there may be mentioned organic pigments such as azo lake pigments, phthalocyanine pigments, indigo pigments, perylene pigments, quinophthalone pigments, dioxazine pigments, quinacridone pigments, isoindolinone pigments and metal chelate pigments as well as inorganic pigments such as chrome yellow, yellow iron oxide, iron oxide red, titanium dioxide and carbon black, for instance. The addition amounts of the luster pigment and color pigment can be selected arbitrarily according to the desired color hue to be developed. Various extender pigments can also be combinedly used.

In cases that the luster pigments and/or color pigments are used in combination, the total pigment content (PWC: pigment weight concentration) is preferably less than 50%, more preferably less than 30%. When it exceeds 50%, the appearance of the coating films becomes poor.

It is possible to incorporate, in the above base coating, one or more of various additives usable in the clear coating composition according to the first, second or third aspect of the invention.

In cases that the substrate is provided with an undercoat with an undercoat or intermediate coating or the like, the above base coating can be applied onto the undercoat by the wet-on-wet (W/W) or wet-on-dry (W/D) technique. The W/W technique comprises forming an undercoat, drying the same by air drying or the like, and applying the base coating film while the undercoat is still in an uncured or semi-cured state, while the W/D technique comprises applying the base coating film onto an undercoating film which has been cured by baking.

The method of forming the base coating film on the substrate is not particularly restricted but the spraying method, roll coater method and the like are preferred. It is also possible to repeat coating a plurality of times. The dry thickness of the base coating films is preferably 5 to 50 μm, more preferably 10 to 30 μm, per coat.

At least one clear coating film is formed on the thus-formed base coating film using the clear coating composition according to the first, second or third aspect of the invention. The method of forming the clear coating film is not particularly restricted but the spraying method, roll coater method and the like are preferred. The dry thickness of the clear coating film is preferably 20 to 50 μm, more preferably 25 to 40 μm, per coat.

The formation of the above clear coating film may be after or before curing of the base coating. In the case of formation prior to curing, the base coating film and clear coating film applied by the W/W technique are cured simultaneously. In cases that the clear coating film is applied repeatedly a plurality of times, the baking may be carried out simultaneously after formation of the last clear coating film or maybe carried layer by layer. The baking is preferably effected at a temperature of 120 to 160° C. The multilayer coating films of the present invention can be obtained by the formation method such as mentioned above.

According to the first aspect of the present invention, a clear coating comprising 100 parts by mass (on the solid basis) of a crosslinkable coating film-forming resin and a crosslinking agent and 0.01 to 2 parts by mass of a specific ladder silicone copolymer, a method of forming a coating film and a multilayer coating film can be provided with or by which good water repellency of coating films, which is a factor giving deluxe feeling to car owners, as well as good non-sanding recoatability in the event of repair and retouching of coating films impaired by adhesion of a dirtying substance in the automotive coating line can be attained. The coating films obtained in accordance with the first aspect of the invention show good water repellency and non-sanding recoatability, as mentioned above, hence are preferably utilized in the fields of shell plates for vehicles such as automobiles, bicycles and the like, container exterior surfaces, coil coating, household electrical appliances, and so forth.

The mechanisms of curing of the clear coating compositions according to the second and third aspect of the invention are as follows: First, upon heating, the carboxyl and carboxylate ester groups in the polymer (C) react with each other to form acid anhydride groups in the polymer (C) and the corresponding free monohydric alcohol is formed. The monohydric alcohol formed is removed out of the system without being evaporated. The acid anhydride groups formed in the polymer (C) react with the hydroxyl groups contained in the polymers (D) and (E) and the polymer (G) and/or (H) optionally added to form crosslinking sites and regenerate acid groups. These acid groups and the carboxyl groups, optionally added, contained in the polymer (G) and/or polymer (H) react with the glycidyl groups contained in the polymers (D) and (E) and the polymer (G) optionally added and with the acid contained in the polymer (C) to thereby form crosslinking sites. In this way, 3 to 5 polymer species react mutually, whereby curing proceeds.

Since the polymers react mutually according to the above mechanisms, it becomes possible to obtain high crosslink densities. According to the second and third aspects of the invention, the ladder silicone oligomer in the polymer (E) provides high water repellency and improved stain resistance. Thus, it is now possible to provide clear coating compositions, methods of forming a coating film and multilayer coating films which lead to prevention of the pollution by coating films. Further, in the third aspect of the invention, the non-sanding adhesiveness can be improved by adding the polyethylene oxide- or polypropylene oxide-modified silicone compound (F). The coating films obtained in accordance with the second and third aspects of the invention have good stain resistance, as mentioned above, and therefore can be used with advantage in the fields of shell plates for vehicles such as cars and bicycles, container exterior surfaces, coil coating, household electrical appliances, and so forth.

BEST MODES FOR CARRYING OUT THE INVENTION

In the following, several examples and comparative examples are given for more specifically illustrating the first, second and third aspects of the invention. These examples are, however, by no means limitative of the scope of the first, second or third aspect of the invention. The amounts of materials are given in terms of part(s) by mass, unless otherwise specified.

Substrate Preparation

Dull steel sheets (300 mm long, 100 mm wide and 0.8 mm thick) were degreased and then subjected to chemical conversion treatment using a zinc phosphate treatment agent ("Surfdine SD 2000™", product of Nippon Paint), followed by electrodeposition coating with a cationic electrodeposition coating composition ("Powertop U-50™", product of Nippon Paint) to a dry film thickness of 25 µm. Then, after 30 minutes of baking at 160° C., a polyester resin/melamine resin-based intermediate coating composition was applied to the sheets by air spraying to a dry film thickness of 40 µm, followed by 30 minutes of baking at 140° C. to form intermediate coating films. Substrates were thus prepared.

Ladder Silicone Polymers (Polymers (B))

RS 1: "Sunflure LS 190™" a (product of Showa Denko) is a copolymer of 10 to 15% by mass of a (meth)acryloxyalkyl-containing ladder silicone oligomer and another acrylic monomer and has a hydroxyl value (on the solid basis) of 100 and a solid content of 50%.

RS 2: A 2-liter reaction vessel equipped with a thermometer, stirrer, condenser, nitrogen inlet tube and dropping funnel was charged with 400 parts of butyl acetate and the temperature was raised to 125° C. Using the dropping funnel, a monomer and initiator solution composed of 100 parts of styrene, 200 parts of glycidylmethacrylate, 200 parts of 4-hydroxybutyl acrylate, 400 parts of n-butyl methacrylate, 200 parts of a (meth)acryloxyalkyl-containing ladder silicone oligomer "Sunflure LS 112™" (product of Showa Denko) and 70 parts of tert-butyl peroxy-2-ethylhexanoate was added dropwise over 3 hours. Thereafter, the mixture was maintained at 125° C. for 30 minutes and, then, a solution composed of 10 parts of tert-butyl peroxy-2-ethylhexanate and 250 parts of xylene was added dropwise over 30 minutes. After completion of the dripping, the reaction was further allowed to proceed at 125° C. for 2 hours to give a glycidyl-containing ladder silicone polymer (RS 2) with a nonvolatile matter content of 59% and a number average molecular weight of 4,500.

RS 3: A 2-liter reaction vessel equipped with a thermometer, stirrer, condenser, nitrogen inlet tube and dropping funnel was charged with 400 parts of butyl acetate and the temperature was raised to 125° C. Using the dropping funnel, a monomer and initiator solution composed of 300 parts of styrene, 600 parts of n-butyl methacrylate, 200 parts of an acryloxyalkyl-containing ladder silicone oligomer "Sunflure LS 112™" (product of Showa Denko) and 250 parts of tert-butyl peroxy-2-ethylhexanoate was added dropwise over 3 hours. Thereafter, the mixture was maintained at 125° C. for 30 minutes and, then, a solution composed of 10 parts of tert-butyl peroxy-2-ethylhexanate and 250 parts of xylene was added dropwise over 30 minutes. After completion of the dripping, the reaction was further allowed to proceed at 125° C. for 2 hours to give a functional group-free ladder silicone polymer (RS 3) with a nonvolatile matter content of 59% and a number average molecular weight of 4,300.

EXAMPLE 1

A clear coating composition 1 was prepared by adding 1 part by weight of the ladder silicone polymer RS 1 to 100 parts by weight of a hydroxyl-containing acrylic resin/melamine resin-based coating ("Superlac 130 Clear NO™", resin and crosslinking agent solids 50% by mass, product of Nippon Paint), followed by dilution with a thinner. (It contained 1 part of the ladder silicone polymer per 100 parts of the resin and crosslinking agent on the solid basis.)

A hydroxyl-containing acrylic resin/melamine resin-based metallic base coating ("Superlac M-180 BKLO NO™", product of Nippon Paint) was applied to the substrates mentioned above and, after this base coating film formation, the clear coating composition 1 prepared in the above manner was applied by the wet-on-wet technique, followed by 30 minutes of baking at 140° C.

EXAMPLE 2

A clear coating composition 2 was prepared by adding 0.8 part by weight of the ladder silicone polymer RS 1 to 100 parts by weight of a mixture of a hydroxyl-containing acrylic resin/polyisocyanate-based clear coating ("nax Mighty Lac GII 240 2-Coat Clear™", product of Nippon Paint) and a crosslinking agent, followed by dilution with a thinner. (It contained 1 part of the ladder silicone copolymer per 100 parts of the resin and crosslinking agent on the solid basis.)

A hydroxyl-containing acrylic resin/polyisocyanate-based metallic base coating ("nax Superior 2 K 3044 Snow Metallic Coarse™", product of Nippon Paint) was applied to the substrates mentioned above and, after this base coating film formation, the clear coating composition 2 prepared in the above manner was applied by the wet-on-wet technique, followed by 60 minutes of baking at 80° C.

EXAMPLE 3

A clear coating composition 3 was prepared by adding 0.8 part by weight of the ladder silicone copolymer RS 2 to 100 parts by weight of a clear coating ("Macflow O-590-1 Clear NO™", resin and crosslinking agent solids 48% by mass, product of Nippon Paint), in which glycidyl and carboxyl groups are main reactants in the curing reaction, followed by dilution with a thinner. (It contained 1 part of the ladder silicone copolymer per 100 parts of the resin plus crosslinking agent on the solid basis.)

A hydroxyl-containing acrylic resin/melamine resin-based metallic base coating composition ("Superlac M-180 BKLO NO™", product of Nippon Paint) was applied to the substrates mentioned above and, after this base coating film formation, the clear coating composition 3 prepared in the above manner was applied by the wet-on-wet technique, followed by 30 minutes of baking at 140° C.

EXAMPLE 4

A clear coating composition 4 was prepared by adding 1 part by weight of the ladder silicone copolymer RS 1 to 100 parts by weight of "Superlac O-130 Clear NO™", (product of Nippon Paint), in which a hydroxyl-containing acrylic resin and melamine are main reactants in the curing reaction, diluting this with a thinner, applying a clear coating composition 4 prepared as mentioned above, followed by curing.

A hydroxyl-containing acrylic resin/melamine resin-type water-based metallic base coating ("NWB 260 BKLO™", product of Nippon Paint) was applied to the substrates mentioned above and, after 15 minutes of preheating of the thus-formed base coating at 80° C., the clear coating composition 4 as mentioned above was applied, followed by 30 minutes of baking at 140° C.

COMPARATIVE EXAMPLE 1

A clear coating composition 5 was prepared by diluting a hydroxyl-containing acrylic resin/melamine resin-based clear coating ("Superlac 130 Clear NO™", product of Nippon Paint) with a thinner without using any ladder silicone copolymer. Otherwise the procedure of Example 1 was followed.

COMPARATIVE EXAMPLE 2

The procedure of Example 3 was followed in the same manner except that the ladder silicone copolymer RS 2 was used in an amount of 4 parts. (The ladder silicone copolymer amounted to 5 parts per 100 parts of the resin plus crosslinking agent on the solid basis.)

COMPARATIVE EXAMPLE 3

The procedure of Example 3 was followed in the same manner except that the functional group-free ladder silicone copolymer RS 3 was used in lieu of the ladder silicone copolymer used in Example 3.

Top Coating Films

The topcoat base coatings of the examples or comparative examples were applied, by spraying, to the substrates mentioned above to a dry film thickness of 15 μm. The application was carried out using an electrostatic spray coater ("Auto REA™", product of ABB Industries) at an atomizing pressure of 2.8 kg/cm². During application, the booth atmosphere was maintained at a temperature of 25° C. and a humidity of 75%. After 3 minutes of setting following application in examples and comparative examples other than example 4, the topcoat clear coating compositions of the examples or comparative examples were applied to a dry film thickness of 35 μm. After 10 minutes of setting, the two coating film layers were baked simultaneously at a temperature of 140° C. for 30 minutes. The multilayer coating films obtained were evaluated for water repellency by measuring the angle of contact with water immediately after baking of the base coating film and clear coating film and the angle of contact with water after wiping with isopropanol-impregnated gauze, using a contact angle meter ("CA-D™", product of Kyowa Interface Science). Further, non-sanding recoatability evaluations were made by applying the respective base coatings and clear coating compositions to the clear coating films formed in the above manner without sanding, baking the recoated coating films, subjecting the recoated coating films to a cross cut tape test (one hundred 1 mm squares; according to JIS K 5400) and counting the remaining squares. The results are shown in Table 1.

TABLE 1

| | Water repellency of coating films | | |
| --- | --- | --- | --- |
| | Just after baking | After isopropanol wiping | Non-standing recoatability |
| Ex. 1 | 99° | 99° | 100 |
| Ex. 2 | 98° | 98° | 100 |
| Ex. 3 | 99° | 99° | 100 |
| Ex. 4 | 98° | 98° | 100 |
| Compar. Ex. 1 | 88° | 88° | 100 |
| Compar. Ex. 2 | 99° | 99° | 30 |
| Compar. Ex. 3 | 99° | 88° | 100 |

As is evident from the results shown in Table 1, the multilayer coating films obtained in Examples 1 to 4 by using the clear coating compositions according to the present invention showed good water repellency and non-sanding recoatability. On the contrary, the coating films formed in Comparative Examples 1 and 3 were not enough in water repellency, while the coating films obtained in Comparative Example 2 were not enough in non-sanding recoatability.

SYNTHESIS EXAMPLE 1

Carboxyl- and Carboxylate Ester Group-containing Polymer (Polymer (C))

A 3-liter reaction vessel equipped with a thermometer, stirrer, condenser, nitrogen inlet tube and dropping funnel was charged with 150 parts by mass of xylene and 400 parts by mass of "Solvesso 100™" (aromatic hydrocarbon solvent, product of Shell Chemical) and the temperature was raised to 130° C. Using the dropping funnel, a solution composed of 300 parts by mass of styrene, 109 parts by mass of 2-ethylhexyl methacrylate, 325 parts by mass of isobutyl acrylate, 25.7 parts by mass of acrylic acid, 240 parts by mass of maleic anhydride, 300 parts by mass of propylene glycol monomethyl ether acetate, 60 parts by mass of tert-butyl peroxy-2-ethylhexanoate and 150 parts by mass of xylene was added dropwise to the above vessel over 3 hours. After completion of the dripping, the mixture was maintained at 130° C. for 30 minutes and, then, a solution composed of 10 parts by mass of tert-butyl peroxy-2-ethylhexanoate and 20 parts by mass of xylene was added dropwise over 30 minutes. Thereafter, the reaction was allowed to further proceed at 130° C. for 1 hour to give a carboxyl- and carboxylic acid anhydride group-containing polymer solution (c-1) with a nonvolatile matter content of 60% and a number average molecular weight of 4,500. Methanol (125 parts by mass) was added to 1,590 parts by mass of this polymer solution (c-1) and the reaction was allowed to proceed at 70° C. for 23 hours to give a carboxyl- and carboxylate ester group-containing polymer (C) in solution form with an acid value of 157 (mg KOFT/g). Upon infrared absorption spectrometry of this polymer (C), the disappearance of the acid anhydride group-due absorption (1785 cm$^{-1}$) was confirmed.

SYNTHESIS EXAMPLE 2

Hydroxyl- and Glycidyl-containing Polymer (Polymer (D))

A 3-liter reaction vessel equipped with a thermometer, stirrer, condenser, nitrogen inlet tube and dropping funnel was charged with 150 parts by mass of xylene and 400 parts by mass of propylene glycol monomethyl ether acetate and the temperature was raised to 130° C. Using the dropping funnel, a solution composed of 200 parts by mass of VeoVa-9, 229 parts by mass of glycidyl methacrylate, 231 parts by mass of 4-hydroxybutyl acrylate, 340 parts by mass of cyclohexyl methacrylate, 60 parts by mass of tert-butyl peroxy-2-ethylhexanoate and 150 parts by mass of xylene was added dropwise to the above vessel over 3 hours. After completion of the dripping, the mixture was maintained at 130° C. for 30 minutes and, then, a solution composed of 10 parts by mass of tert-butyl peroxy-2-ethylhexanoate and 20 parts by mass of xylene was added dropwise over 30 minutes. Thereafter, the reaction was allowed to further proceed at 130° C. for 1 hour to give a hydroxyl- and epoxy-containing polymer (D) in solution form with a nonvolatile matter content of 60%, a number average molecular weight of 4,600, an epoxy equivalent of 625 and a hydroxyl equivalent of 623.

SYNTHESIS EXAMPLE 3

Hydroxyl-, Glycidyl- and Ladder Silicon-containing Polymer (Polymer (E)

A 3-liter reaction vessel equipped with a thermometer, stirrer, condenser, nitrogen inlet tube and dropping funnel was charged with 50 parts by mass of xylene and 400 parts by mass of propylene glycol monomethyl ether acetate and the temperature was raised to 130° C. Using the dropping funnel, a solution composed of 200 parts by mass of "VeoVa-9™" (product of Shell), 229 parts by mass of glycidyl methacrylate, 231 parts by mass of 4-hydroxybutyl acrylate, 240 parts by mass of cyclohexyl methacrylate, 200 parts by mass of the acryloxyalkyl-containing ladder silicone oligomer "Sunflure LS 112™"(product of Showa Denko), 120 parts by mass of tert-butyl peroxy-2-ethylhexanoate and 150 parts by mass of xylene was added dropwise to the above vessel over 3 hours. After completion of the dripping, the mixture was maintained at 130° C. for 30 minutes and, then, a solution composed of 10 parts by mass of tert-butyl peroxy-2-ethylhexanoate and 20 parts by mass of xylene was added dropwise over 30 minutes. Thereafter, the reaction was allowed to further proceed at 130° C. for 1 hour to give a hydroxyl-, epoxy- and ladder silicone-containing polymer (E) in solution form with a nonvolatile matter content of 60%, a number average molecular weight of 4,700, an epoxy equivalent of 625 and a hydroxyl equivalent of 623.

SYNTHESIS EXAMPLE 4

Hydroxyl- and Carboxyl-containing Polymer (Polymer (G1))

A 2-liter reaction vessel equipped with a thermometer, stiffer, condenser, nitrogen inlet tube and dropping funnel was charged with 360 parts by mass of "Arcosolv PMA™" (product of Kyowa Yuka) as solvent, 777 parts by mass of 4-hydroxybutyl acrylate, 665 parts by mass of hexahydrophthalic anhydride and 0.48 part by mass of hydroquinone monomethyl ether, and the temperature was raised to 145° C. and maintained at that temperature for 20 minutes. Thereafter, the mixture was cooled and taken out of the reaction vessel, whereby a mixture composed of a carboxyl-containing ethylenically unsaturated monomer (g-1) and a hydroxy-containing ethylenically unsaturated monomer (g-2) was obtained. Then, another 3-liter reaction vessel equipped with a thermometer, stiffer, condenser, nitrogen inlet tube and dropping funnel was charged with 300 parts by mass of xylene and 200 parts by mass of Arcosolv PMA solvent and the temperature was raised to 130° C. Then, 1,300 parts by mass of the above mixture composed of carboxyl containing ethylenically unsaturated monomer (g-1) and a hydroxy-containing ethylenically unsaturated monomer (g-2) and 100 parts by mass of tert-butyl peroxy-2-ethylhexanoate were added dropwise over 3 hours. The mixture was maintained at 130®C. for 30 minutes and, then, a mixed solution composed of 10 parts by mass of tert-butyl peroxy-2-ethylhexanoate and 100 parts by mass of xylene was added dropwise over 30 minutes. Thereafter, the mixture, was maintained at 130° C. for 30 minutes and then taken out of the vessel to give a hydroxyl- and carboxyl-containing polymer (G) in solution form with a nonvolatile matter content of 54%, a number average molecular weight of 2,000 and acid value of 168 and a hydroxyl value of 42 on the solid basis.

SYNTHESIS EXAMPLE 5

Fluoropolymer (Polymer (H))

A 200-milliliter stainless steel autoclave equipped with a stirrer was charged with 116 parts by mass of tert-butanol, 11.7 parts by mass of cyclohexyl vinyl ether, 11.1 parts by mass of ethyl vinyl ether, 7.17 parts by mass of hydroxybutyl vinyl ether, 5.72 parts by mass of glycidyl vinyl ether, 0.69 part by mass of calcium carbonate and 0.06 part by mass of azobisisobutyronitrile, and the dissolved oxygen was eliminated by solidification with liquid nitrogen and deaeration. Then, 36 parts by mass of chlorotrifluoroethylene was introduced into the autoclave and the reaction was allowed to proceed by gradually raising the temperature to give a polymer (H).

EXAMPLE 5 to 9 and COMPARATIVE EXAMPLES 4 and 5

Preparation of Top Clear Coating Compositions

Top clear coating compositions 1 to 7 were prepared by dissolving the polymers, tetrabutylammonium bromide (as curing catalyst), "Tinuvin 900™" (as ultraviolet absorber; product Ciba Specialties Chemicals) and "Sanol LS 292 ™" (as light stabilizer; product of Sankyo) according to the formulations shown in Table 2. The top clear coating compositions 6 and 7 were for comparison. The formulation shown in Table 2 are expressed by solid contents.

TABLE 2

| | | Polymer | | | | | Curing | UV | Light |
|---|---|---|---|---|---|---|---|---|---|
| | | C | D | E | F | G | catalyst | absorber | Stabilizer |
| Clear coating composition | 1 | 39 | 34 | 34 | 0 | 0 | 0.35 | 0.7 | 0.35 |
| | 2 | 39 | 37 | 1 | 0 | 0 | 0.35 | 0.7 | 0.35 |
| | 3 | 31 | 37 | 1 | 8 | 0 | 0.35 | 0.7 | 0.35 |
| | 4 | 39 | 60 | 1 | 0 | 18 | 0.35 | 0.7 | 0.35 |
| | 5 | 31 | 63.5 | 1 | 8 | 9 | 0.35 | 0.7 | 0.35 |
| | 6 | 39 | 68 | 0 | 0 | 0 | 0.35 | 0.7 | 0.35 |
| | 7 | 31 | 68 | 0 | 8 | 0 | 0.35 | 0.7 | 0.35 |

Top Coatings

A hydroxyl-containing acrylic resin/melamine resin-based metallic base coating composition ("Superlac M-180 BKLO NO™", product of Nippon Paint) was applied to the substrates mentioned above by spraying to a dry film thickness of 15 μm and, after this base coating film formation, the clear coating compositions 1 to 7 prepared in the above manner and shown in Table 2 were each applied to a dry film thickness of 35 μm by the wet-on-wet technique. After 10 minutes of setting at room temperature, both coating film layers were baked simultaneously at a temperature of 140° C. for 30 minutes. The two-layer multilayer coating films obtained were evaluated for pencil hardness, warm water resistance, acid resistance and stain resistance according to the following evaluation methods and criteria. The results are shown in Table 3.

Pencil hardness: Measurements were made according to JIS K 5400.

Warm water resistance: Specimens were immersed in warm water at 40° C. for 10 days and then the surface of each multilayer coating film was evaluated by visual observation. When no change was observed, the evaluation result "no abnormality" was given.

Acid resistance: A 0.1 N aqueous solution of sulfuric acid (0.2 milliliter) was dropped onto the multilayer coating film surface and, after 2 hours contacting at 55 to 60° C. the surface was evaluated by visual observation.

◉: No trace is observable.
○: A slight trace is observed.
×: A distinct trace is observed.

Stain resistance: A 3% aqueous solution of egg albumin was prepared and 0.2 milliliter of this solution was dropped onto the multilayer coating surface and, after 1 hour of contacting at 50° C. and a humidity of 30%, the solution was wiped off with tap water. After 24 hours, the surface was evaluated by visual observation.

◉: No trace is observable.
○: A slight trace is observed.
×: A distinct trace is observed.

TABLE 3

|  | | Clear coating composition No. | Pencil hardness | Warm water resistance | Acid resistance | Stain resistance |
| --- | --- | --- | --- | --- | --- | --- |
| Ex. | 5 | 1 | H | No abnormality | ◉ | ◉ |
|  | 6 | 2 | H | No abnormality | ◉ | ○ |
|  | 7 | 3 | H | No abnormality | ◉ | ○ |
|  | 8 | 4 | H | No abnormality | ◉ | ○ |
|  | 9 | 5 | H | No abnormality | ◉ | ○ |
| Compar. Ex. | 4 | 6 | H | No abnormality | ◉ | × |
|  | 5 | 7 | F | No abnormality | ◉ | × |

EXAMPLES 10 to 13 and COMPARATIVE EXAMPLE 6

Preparation of Top Clear Coating Composition

Top clear coating compositions 8 to 12 were prepared by dissolving the polymers, the silicone compounds D1 to D3 specified in Table 4 (by solid), tetrabutylammonium bromide (as curing catalyst), "Tinuvin 900™", (as ultraviolet absorber; product Ciba Specialty Chemicals) and Sanol LS 292 (as light stabilizer; product of Sankyo) according to the formulations shown in Table 4. The top clear coating composition 13 was for comparison.

Silicone compound D1: "Silwet L-7001™" (product of Nippon Unicar)
Silicone compound D2: "BYK 341™" (product of BYK Chemie Japan)
Silicone compound D3: "BYK 344™" (product of BYK Chemie Japan)

TABLE 4

|  |  | polymer C | polymer D | polymer E | polymer G | polymer H | Silicon compound F Species | Addition level (PHR) | curing catalyst | UV absorber | Light stabilizer |
| --- | --- | --- | --- | --- | --- | --- | --- | --- | --- | --- | --- |
| Clear coating composition | 8 | 39 | 45 | 22 | 0 | 0 | D1 | 0.1 | 0.35 | 0.7 | 0.35 |
|  | 9 | 39 | 55 | 12 | 8 | 0 | D2 | 0.2 | 0.35 | 0.7 | 0.35 |
|  | 10 | 39 | 55 | 12 | 0 | 0 | D3 | 0.2 | 0.35 | 0.7 | 0.35 |
|  | 11 | 31 | 45 | 22 | 8 | 9 | D2 | 0.5 | 0.35 | 0.7 | 0.35 |
|  | 12 | 39 | 45 | 22 | 8 | 0 | — | 0 | 0.35 | 0.7 | 0.35 |

Top Coatings

A hydroxyl-containing acrylic resin/melamine resin-based metallic base coating composition ("Superlac M-180 BKLO NO™", product of Nippon Paint) was applied to the substrates mentioned above by spraying to a dry film thickness of 15 μm and, after this base coating film formation, the clear coating compositions 8 to 12 prepared in the above manner and shown in Table 4 were each applied to a dry film thickness of 35 μm by the wet-on-wet technique. After 10 minutes of setting at room temperature, both coating film layers were baked simultaneously at a temperature of 140° C. for 30 minutes. The two-layer multilayer coating films obtained were evaluated for pencil hardness, warm water resistance, non-sanding recoatability and stain resistance according to the same evaluation methods as Example 5. The results are shown in Table 5.

TABLE 5

| | Clear coating composition No. | Pencil hardness | Warm water resistance | Stain resistance | Non-standing recoatability/ Adhesiveness |
|---|---|---|---|---|---|
| Example | 10 | 8 | H | No abnormality | ◎ | 100 |
| | 11 | 9 | H | No abnormality | ◎ | 100 |
| | 12 | 10 | H | No abnormality | ◎ | 100 |
| | 13 | 11 | H | No abnormality | ◎ | 100 |
| Comparative Example | 6 | 12 | H | No abnormality | ◎ | 20 |

The invention claimed is:

1. A clear coating composition which comprises
    (A) 100 parts by mass of a mixture of a crosslinkable coating film-forming resin and a crosslinking agent on a solid basis
    and (B) 0.01 to 2 parts by mass of a ladder silicone copolymer obtained by copolymerizing (b-1) a (meth) acryloxyalkyl-containing ladder silicone oligomer, (b-2) a crosslinkable functional group-containing ethylenically unsaturated monomer and optionally (b-3) another copolymerizable ethylenically unsaturated monomer.

2. The clear coating composition according to claim 1, wherein said component (B) is a ladder silicone copolymer obtained by copolymerization of 1 to 30% by mass of the component (b-1), 1 to 50% by mass of the component (b-2) and 1 to 90% by mass of the component (b-3).

3. The clear coating composition according to claim 1 or 2,
    wherein said crosslinkable functional group in said component (b-2) is a hydroxyl, carboxyl, acid anhydride, glycidyl, amine or isocyanate group.

4. The clear coating composition according to claim 1 or 2, wherein the content of said component (B) is 0.05 to 1 part by mass per 100 parts by mass of said component (A) on a solid basis.

* * * * *

UNITED STATES PATENT AND TRADEMARK OFFICE
CERTIFICATE OF CORRECTION

PATENT NO. : 7,125,936 B2  
APPLICATION NO. : 10/637870  
DATED : October 24, 2006  
INVENTOR(S) : Tatsuya Ishihara et al.

Page 1 of 1

It is certified that error appears in the above-identified patent and that said Letters Patent is hereby corrected as shown below:

<u>Column 27, lines 15-25</u>  
Claim 1 should read as follows:

Col. 27, line 15  
1. A clear coating composition which comprises  
    (A) 100 parts by mass of a mixture of a crosslinkable coating film-forming resin and a crosslinking agent on a solid basis, said film-forming resin comprising at least one selected from the group consisting of acrylic resins, alkyd resins, epoxy resins, polurethane resins, and polyether resins;  
    and (B) 0.01 to 2 parts by mass of a ladder silicone copolymer obtained by copolymerizing (b-1) a (meth) acryloxyalkyl-containing ladder silicone oligomer, (b-2) a crosslinkable functional group-containing ethylenically unsaturated monomer and optionally (b-3) another copolymerizable ethylenically unsaturated monomer.

Signed and Sealed this

Third Day of July, 2007

JON W. DUDAS  
*Director of the United States Patent and Trademark Office*